United States Patent [19]

Caffee et al.

[11] Patent Number: 5,726,624

[45] Date of Patent: Mar. 10, 1998

[54] TEMPERATURE SENSOR WITH INTERNAL RIGID SUBSTRATE

[75] Inventors: Jay H. Caffee, Canyon Country; Steve R. Foote, Huntington Beach, both of Calif.; Ronald J. List, New Port Richey, Fla.

[73] Assignee: Honeywell Inc., Minneapolis, Minn.

[21] Appl. No.: 673,854

[22] Filed: Jul. 1, 1996

[51] Int. Cl.⁶ .............................. H01C 3/04; H01C 7/02; H01C 7/04

[52] U.S. Cl. ........................................... 338/28

[58] Field of Search .................... 338/22 R, 25, 338/28, 30, 323, 327, 328, 329

[56] References Cited

U.S. PATENT DOCUMENTS

| | | | |
|---|---|---|---|
| 4,242,659 | 12/1980 | Baxton et al. | 338/28 |
| 4,375,056 | 2/1983 | Baxton et al. | 338/25 |
| 4,841,273 | 6/1989 | Horton | 338/28 |
| 4,937,552 | 6/1990 | Lam | 338/25 |
| 5,037,488 | 8/1991 | Wignand | 136/230 |
| 5,410,291 | 4/1995 | Kuzuoka | 338/22 R |
| 5,610,571 | 3/1997 | Kuzuoka | 338/22 R |

Primary Examiner—Edward Tso
Attorney, Agent, or Firm—William D. Lanyi; John G. Shudy, Jr.; Roland W. Norris

[57] ABSTRACT

A temperature sensor is made with a rigid substrate disposed within a metallic tube for the purpose of supporting a resistive temperature detector and conductive strips disposed on the substrate. The conductive strips of palladium silver are deposited on the substrate and in electrical communication with gold pads that are used to permit the RTD to be connected to the gold pads by wire bonding techniques. A sleeve is provided at an opposite end of the sensor to support a first end region of the rigid substrate at a preselected position within the tube. The second end region of the substrate extends away from the sleeve and toward an opposite end of the tube, which is crimped to seal it. Conductive wires are avoided within the main portion of the outer metallic tube, thus eliminating the need for fiber glass sleeved wires extending through the tube.

33 Claims, 8 Drawing Sheets

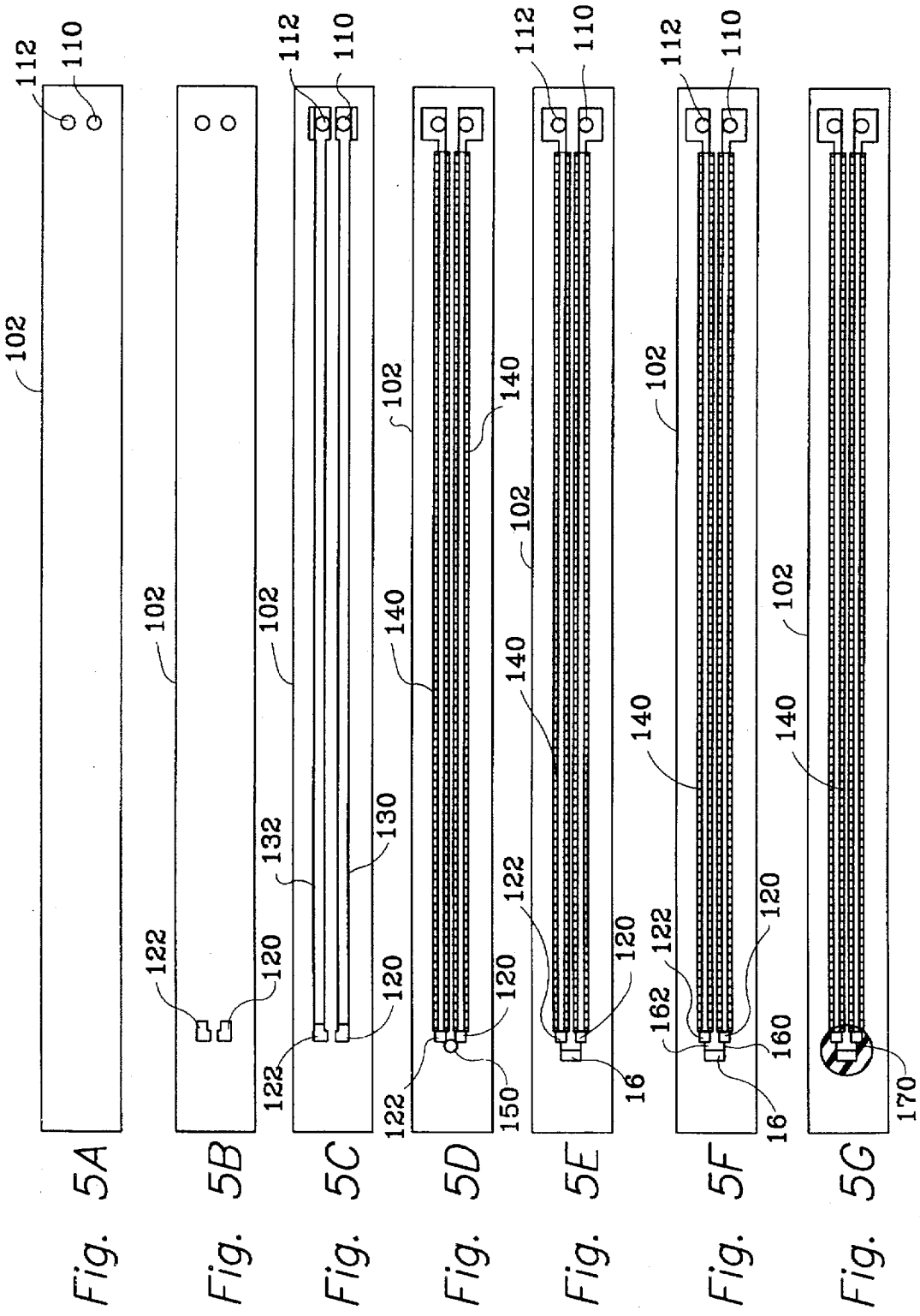

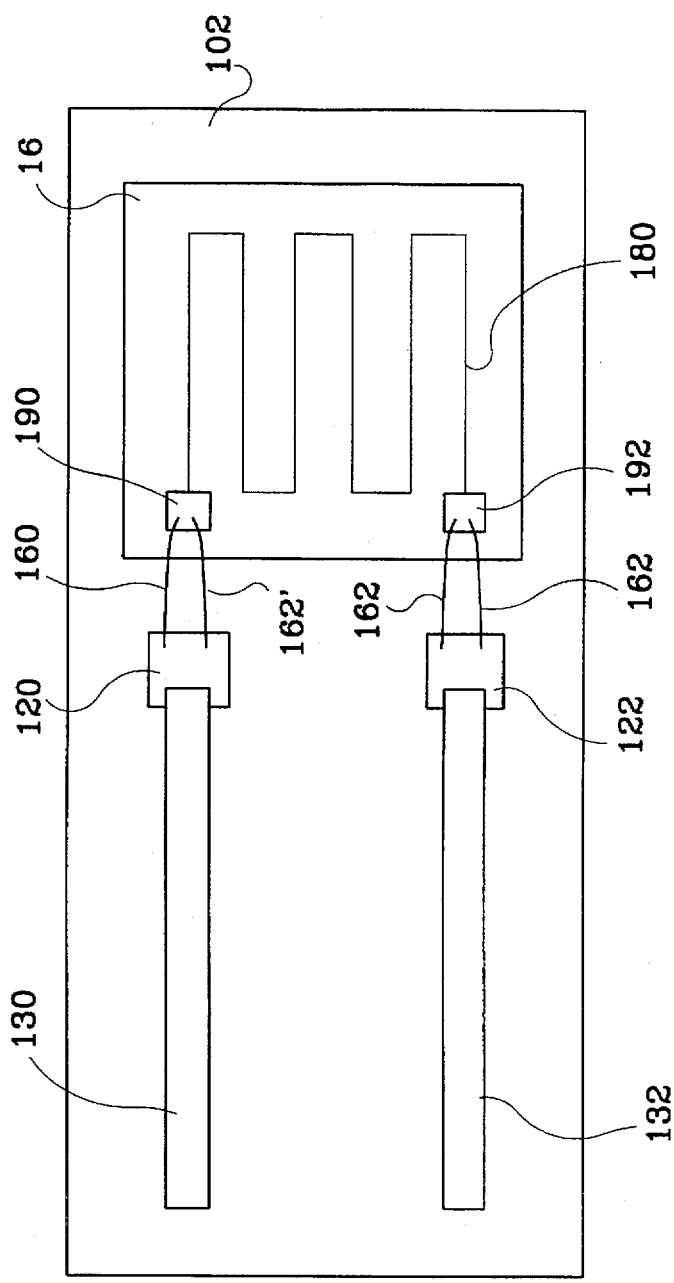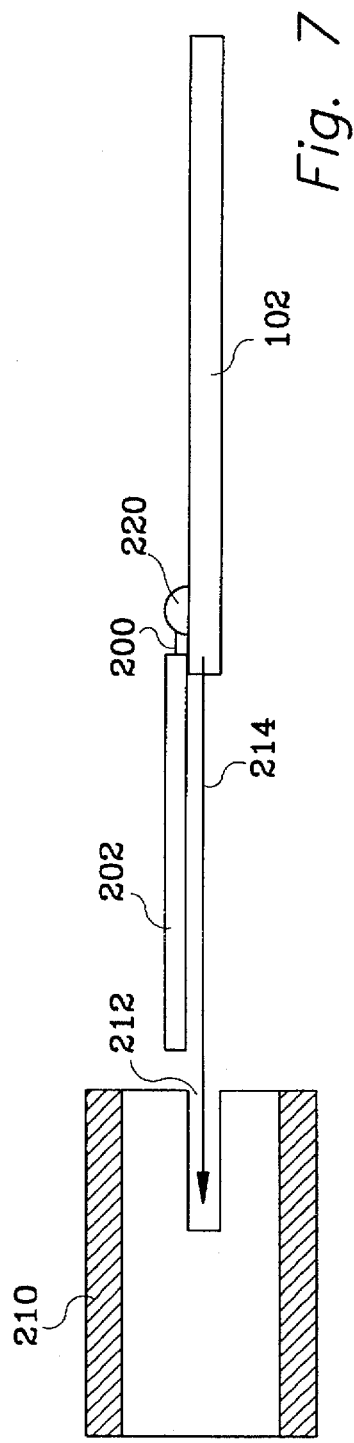

TEMPERATURE SENSOR WITH INTERNAL RIGID SUBSTRATE

BACKGROUND OF THE INVENTION

1. Field of the Invention

The present invention is generally related to temperature sensors and, more particularly, to a temperature sensor that connects a temperature sensitive element to externally accessible wires with deposited conductive strips disposed on a rigid substrate.

2. Description of the Prior Art

Various types of temperature sensors are well known to those skilled in the art. For example, temperature sensors that are used in conjunction with ovens typically comprise a metallic tube in which a temperature sensitive element is disposed inside one end with conductive wires extending within the tube from the temperature sensitive element to an opening at the other end of the tube. The metallic tube is inserted through a wall of the oven to permit the temperature sensitive element to be placed in thermal communication with the internal cavity of the oven. The temperature sensitive element is typically a resistive temperature detector, or RTD.

Several problems exist with temperature sensors made in accordance with the prior art. The conductive wires that extend from the temperature sensitive element to the opening at an opposite end of the tube must be properly insulated to prevent any electrical communication between the conductive wires and the metallic tube. In addition, accurate placement of the temperature sensitive element at the end of the tube can be difficult in view of the fact that the conductive wires are generally flexible and do not provide an efficient way of assuring that the temperature sensitive element is disposed at its proper position at one internal end of the outer tube. In addition to these problems, temperature sensors made in accordance with the prior art require significant manual assembly time and are not conducive to automation.

Throughout the description of the present invention, frequent reference is made to resistive temperature detectors, or RTDs. U.S. Pat. No. 4,375,056, which issued to Baxter et al on Feb. 22, 1983, discloses a thin film resistance thermometer device with a predetermined temperature coefficient of resistance. The thin film resistance thermometer is manufactured to have a predetermined temperature coefficient of resistance while minimizing the amount of metal in the film. The process involves the production of a metal film deposit on an insulating substrate such that the film deposited has a bulk coefficient substantially higher than the desired coefficient with the film being deposited to a thickness that produces the desired coefficient. Although U.S. Pat. No. 4,375,056 teaches a specific type of RTD, it serves to describe the basic technology of resistive temperature detectors, their shape and appearance.

U.S. Pat. No. 4,242,659, which issued to Baxter et al on Dec. 30, 1980, describes a thin film resistance thermometer detector probe assembly. The probe assembly is constructed by locating a header assembly in the end of a cylindrical sleeve. The header is constructed as a stack of discs. The disc exposed to the environment is of stainless steel and the disc supporting the thin film resistance thermometer chip is of ceramic. A copper disc is brazed between the ceramic and the stainless steel to accommodate the different thermal coefficients of expansion. Nail-head pins are brazed to a thick film deposit on the exposed face of the ceramic disc and the resistance thermometer chip is connected electrically between the pins.

Temperature sensors known to those skilled in the art comprise a tube and a temperature sensitive element is placed inside the tube at one extreme end with electrically conductive wires extending from the temperature sensitive element, through the internal cavity of the tube, to the opposite end of the tube where the wires extend to permit the electrical connection of the temperature sensor to other equipment. The basic problems inherent with temperature sensors include the difficulty in placing the temperature sensitive element precisely at a known position within the inside of the tube, the requirement that the flexible wires be insulated to prevent electrical communication between them and the internal surface of the metallic tube and the inherent difficulty in manufacturing and assembling the temperature sensors because of the requirement for manual assembly processes that are not conducive to automation techniques.

U.S. Pat. Nos. 4,242,659 and 4,375,056 are explicitly incorporated by reference herein.

SUMMARY OF THE INVENTION

A temperature sensor made in accordance with the present invention comprises a generally rigid substrate having a first end region and a second end region. A first conductive strip is deposited on the substrate and extends from the first end region to the second end region. A second conductive strip is also deposited on the substrate and extends from the first end region to the second end region. Although not necessary, the two conductive strips are generally parallel to each other. An insulative layer is deposited over the first and second conductive strips with the first and second strips being disposed between the substrate and the insulative layer. A temperature sensitive element is disposed on the second end region of the substrate with the temperature sensitive element being connected electrically between the first and second conductive strips. A tube is provided and the substrate is disposed within the tube with the substrate extending along the length of the tube proximate the central region of the tube.

In a preferred embodiment of the present invention, the substrate is made of aluminum oxide, or alumina, and the first and second conductive strips are made of a palladium silver alloy. The temperature sensitive element can comprise a resistive temperature detector.

In a preferred embodiment of the present invention, a protective coating is disposed over the temperature sensitive element to place the temperature sensitive element between the substrate and the protective coating. The protective coating can be a refractory cement.

In certain embodiments of the present invention, the temperature sensitive element is connected to the first and second conductive strips with wire bonds. In addition, first and second gold pads are deposited on the substrate at the second end region with the first and second gold pads being connected electrically to the first and second conductive strips. The temperature sensitive element is connected electrically between the first and second gold pads. Typically, this structure is formed by first depositing the gold pads on the generally rigid substrate and then depositing the first and second conductive strips partially overlapping the gold pads to provide electrical communication between the gold pads and the electrically conductive strips. Then the gold pads are connected to the temperature sensitive element with wire bonds. In one particular embodiment of the present invention, each gold pad is connected to its respective terminal of the temperature sensitive element with a pair of wire bonds.

In a preferred embodiment of the present invention, a mounting flange is attached to the tube at a preselected position of the tube. The preselected position is a first distance from the first end region and a second distance from the second end region. The mounting flange is attached to a wall of an oven to dispose the first end region at a first location outside of the oven while disposing the second end region in thermal communication with a second location within the oven having an elevated temperature. The first distance is sufficiently distant from the second location to maintain the first end region at a preselected temperature differential below the elevated temperature within the oven. The preselected temperature differential, in a preferred embodiment, is at least 400 degrees Fahrenheit. In certain embodiments of the present invention, the first distance required to maintain the preselected temperature differential is at least one inch. However, in other applications, this first distance can be at least two inches.

In a preferred embodiment of the present invention, the first and second conductive strips are connected electrically to first and second conductive wires proximate the first end region of the substrate. The present invention can further comprise an insulative cover disposed over the first and second conductive strips at the first end region proximate the connection between the first and second conductive strips and the first and second conductive wires. The first and second conductive strips can be connected electrically to the first and second conductive wires with platinum ribbons. Some prototypes were made in this manner. However, it should be understood that the use of platinum ribbons to make this connection is not always required. In a typical application, high temperature solder is used. The solder should be applicable in temperatures above 250° C. This can be accomplished with a Sn-Pb-Ag solder of 10%-88%-2%. The tube is crimped proximate the second end region of the substrate to close the end of the tube.

BRIEF DESCRIPTION OF THE DRAWINGS

The present invention will be more fully and completely understood from a reading of the Description of the Preferred Embodiment in conjunction with the drawings, in which:

FIGS. 5A–5G show progressive steps in the manufacture of the present invention;

FIG. 6 is an enlarged view of one end of a substrate of the present invention;

FIG. 7 shows the combination of a support sleeve and the substrate of the present invention;

DESCRIPTION OF THE PREFERRED EMBODIMENT

Figure 1:
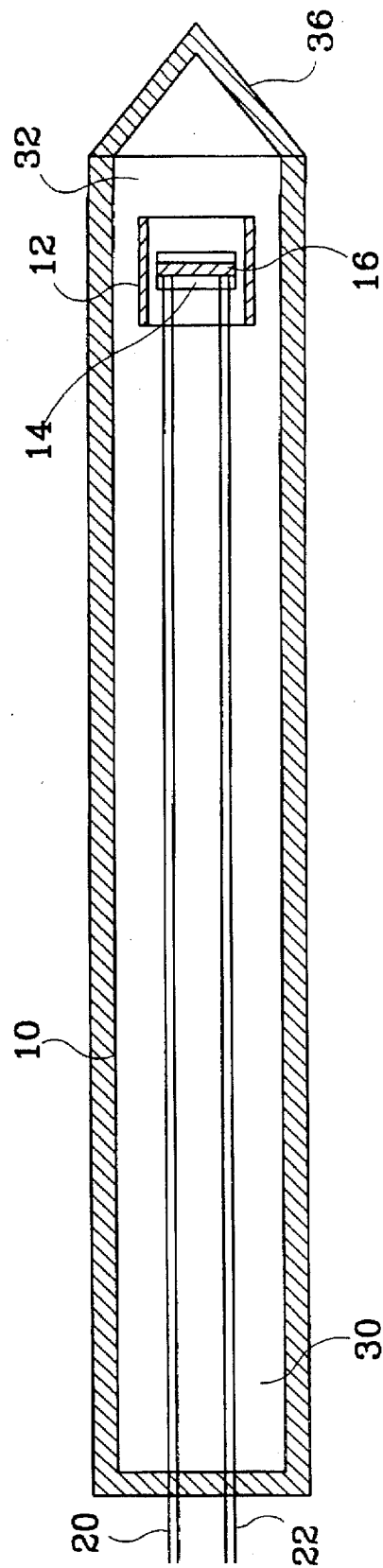
FIG. 1 shows a sectional view of a temperature sensor generally known to those skilled in the art.

Throughout the Description of the Preferred Embodiment, like components will be identified by like reference numerals. In FIG. 1, a known type of temperature sensor is illustrated. A tube 10 is provided and a temperature sensitive element is disposed within the tube. In one type of temperature sensor known to those skilled in the art, a ceramic cylinder 12 is provided and an internal substrate 14 is disposed within the cylinder 12. On the substrate 14, a resistive temperature detector 16 is attached. After the resistive temperature detector 16 is attached to the substrate 14 and the substrate 14 is inserted into the cylinder 12, the remaining portion of the internal cavity of the cylinder 12 is filled with a ceramic paste and cured.

From the resistive temperature detector 16, two conductive wires, 20 and 22, extend to provide electrical connection between the temperature sensitive element and an external device. During the discussion of FIG. 1 and the following discussion relating to the present invention, the sensor will be described in terms of a first end region 30 and a second end region 32. The second end region 32 is the portion of the sensor that is disposed within a hot environment, such as an oven, while the first end region 30 is typically disposed in an environment that more closely approximates room temperature.

The end of the tube 10 identified by reference numeral 36 is crimped to seal that end of the tube. The opposite end of the tube 10 does not have to be crimped although certain embodiments of the sensor can utilize crimping at the end of the tube opposite from the position of the temperature sensitive element.

Figure 2:
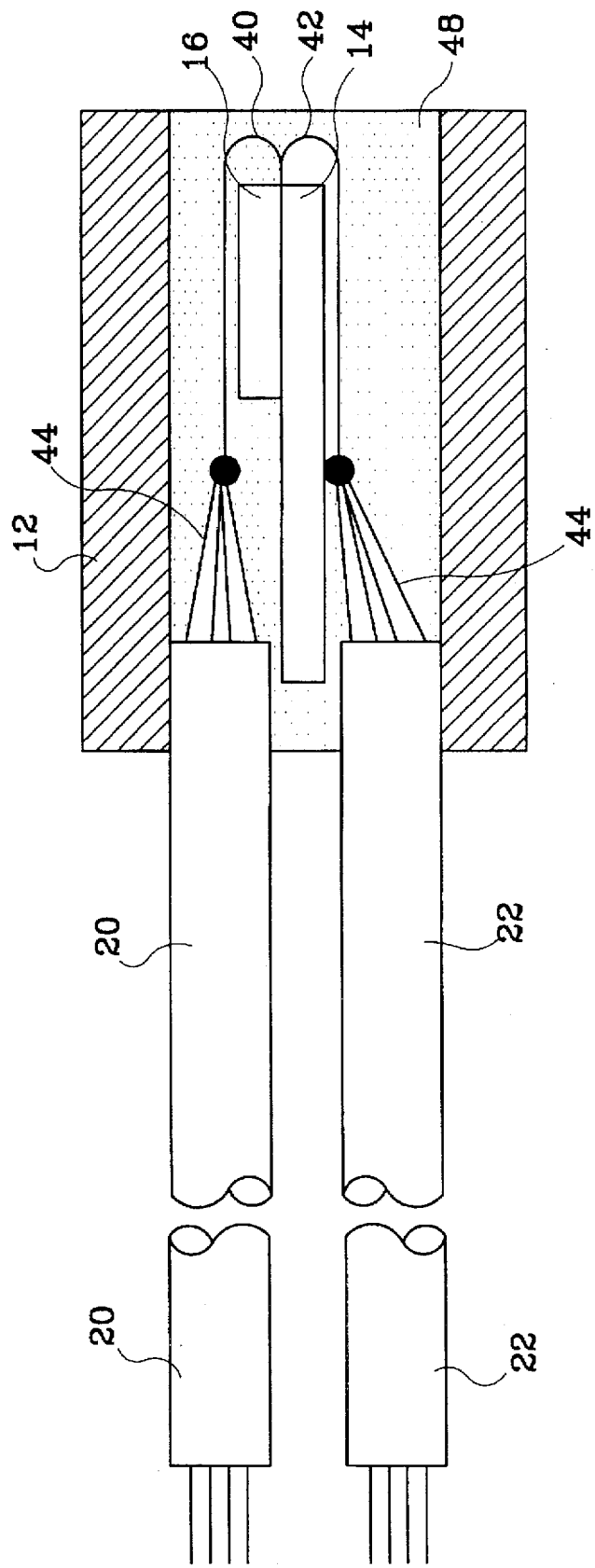
FIG. 2 is an enlarged portion of one end of the temperature sensor shown in FIG. 2.

FIG. 2 is an enlarged view of the temperature sensitive element disposed at the second end region 32 of the temperature sensor described above in conjunction with FIG. 1. The substrate 14, which can typically be an aluminum oxide substrate, is provided to support the resistive temperature detector 16 during manufacture and assembly. In one known type of temperature sensor, the resistive temperature detector 16 comprises an aluminum oxide substrate with serpentine resistive components disposed on its surface. This surface, on which the serpentine pattern is deposited, is attached to the substrate 14 with a ceramic paste. Two conductive pads are provided on the surface of the resistive temperature detector 16. Each of these pads is attached to a platinum ribbon. In FIG. 2, these platinum ribbons are identified by reference numerals 40 and 42. The platinum ribbons are then attached to the internal strands of the electrically conductive wires, 20 and 22. These strands 44 are illustrated schematically in FIG. 2 as extending from the insulative fiberglass covers of the electrically conductive wires, 20 and 22. Within the internal cavity of the cylinder 12, a ceramic paste 48 is injected and hardened by raising its temperature to contain and protect the components of the resistive temperature detector within the cylinder 12. The connection between the internal strands 44 of the electrically conductive wires and the platinum ribbons, 40 and 42, is made by the tungsten inert gas, or TIG, welding process.

With reference to FIGS. 1 and 2, the electrically conductive wires, 20 and 22, must be insulated with a sleeve to prevent any contact between the wires and the internal surface of the tube 10, which is metallic. In order to provide the appropriate dielectric strength of this insulation, a fiberglass sleeve is typically used to surround the strands 44 of conductive wire. However, even when the fiberglass sleeve is used, the dielectric strength of the configuration can degrade in the presence of humidity. Since the electrically conductive wires, 20 and 22, are generally flexible, it is highly likely that the conductors will be in contact with portions of the internal surface of the metallic tube 10, which is typically made of stainless steel. Therefore, it is necessary to prevent electrical communication between the strands 44 and the metallic tube.

Figure 3:
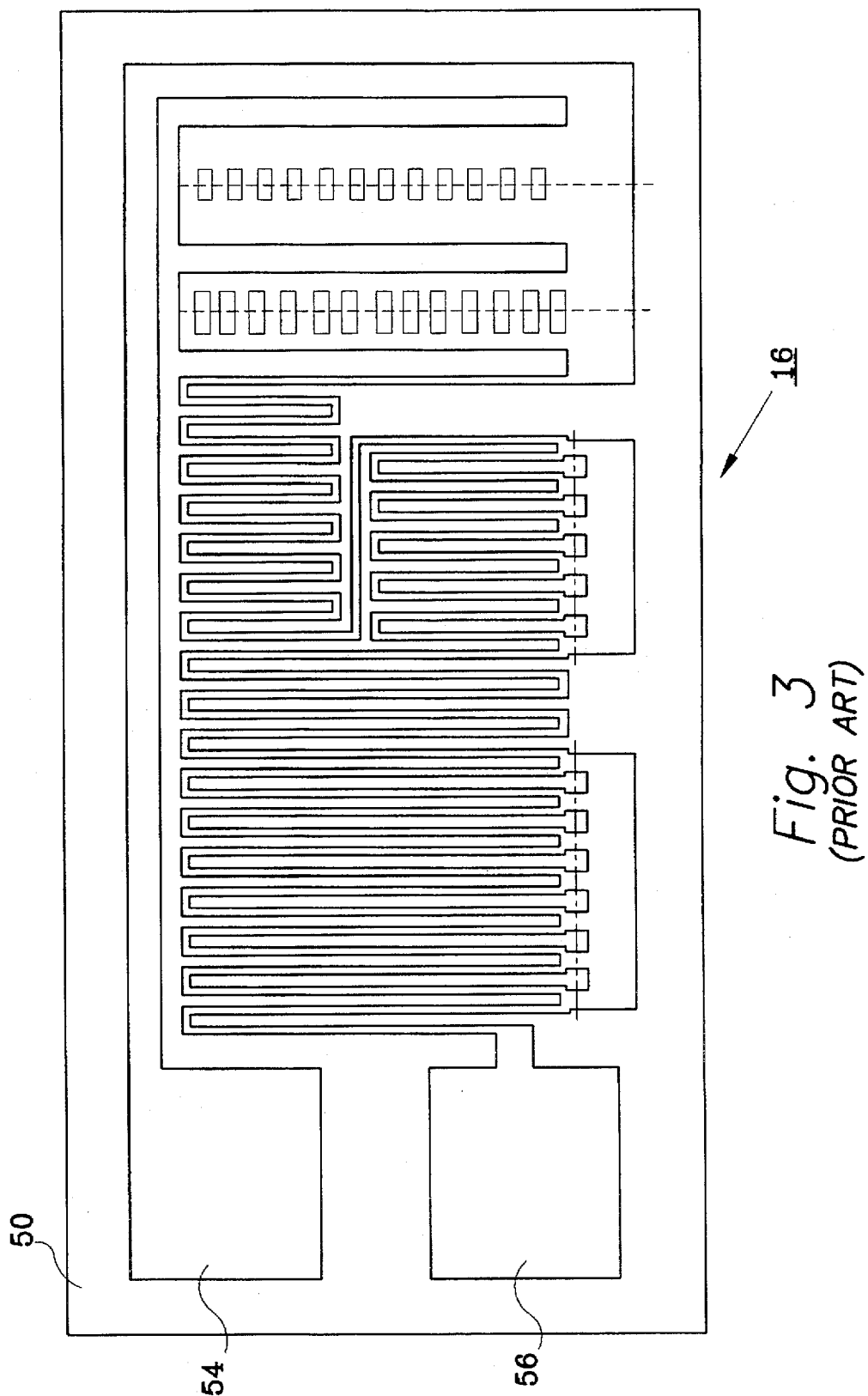
FIG. 3 shows a resistive temperature detector, or RTD, known to those skilled in the art.

FIG. 3 shows a known type of resistive temperature detector such as that which is described in detail in U.S. Pat. No. 4,375,056. The substrate 50 is provided with a resistor that is disposed in a serpentine pattern on the substrate as shown. Two conductive pads, 54 and 56, are shown in FIG. 3. These conductive pads permit the resistive temperature detector to be connected electrically to an external device.

Figure 4:
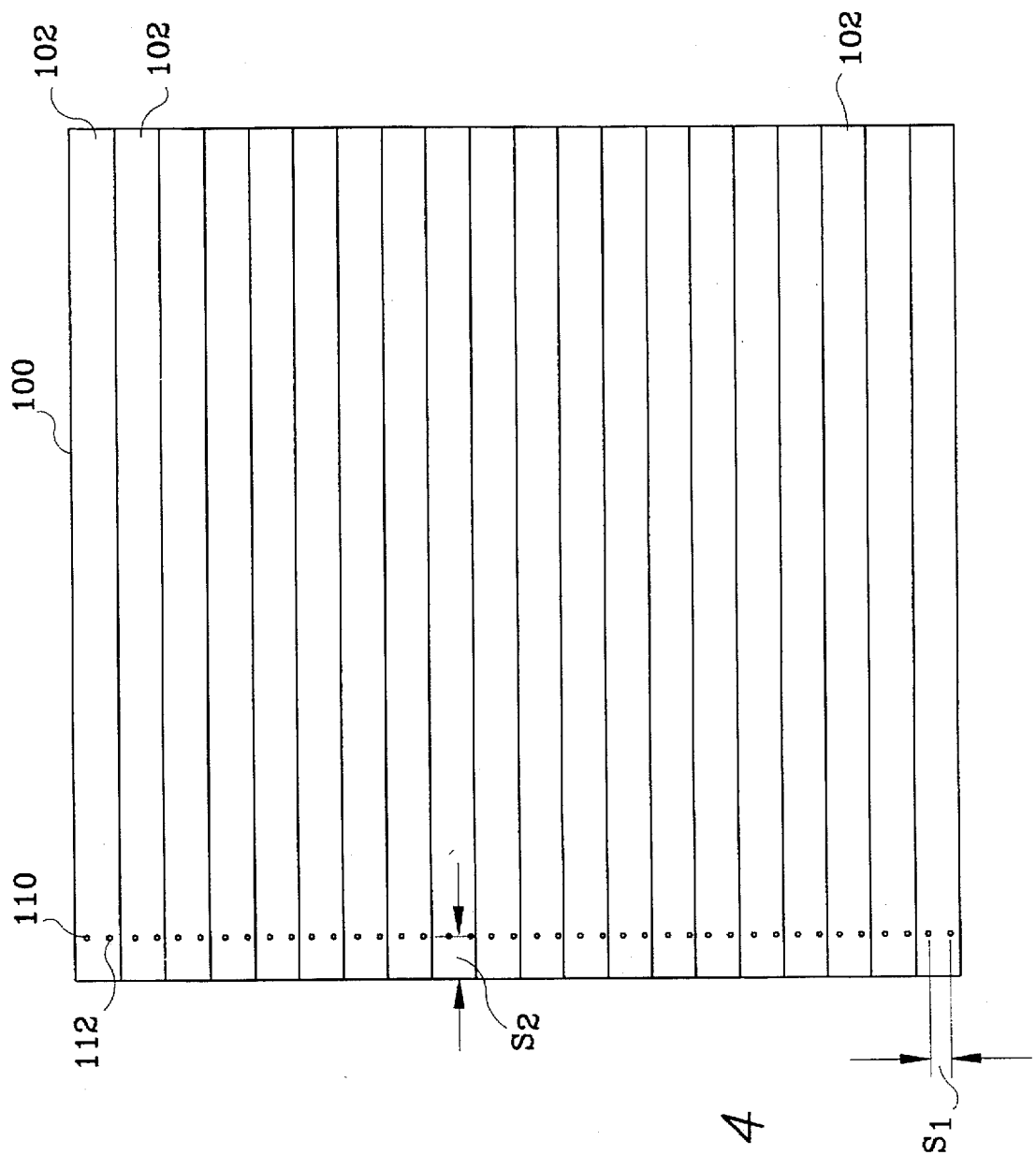
FIG. 4 shows a ceramic substrate used to produce a plurality of substrates of the present invention.

The primary purpose of the present invention is to solve three problems that exist in temperature sensors known to those skilled in the art. The first problem relates to the insulation required to prevent electrical communication between the electrically conductive wires, 20 and 22, and the internal surface of the metallic tube 10 especially in the presence of humidity. The second problem in temperature sensors known to those skilled in the art is the assembly of the temperature sensitive element into the second end of the tube in such a way that its placement is accurately determined. The third problem relates to the intensive manual effort required to assemble temperature sensors known to those skilled in the art. The present invention is therefore intended to provide a temperature sensor that minimizes the problems of insulating the electrically conductive wires, accurately placing the temperature sensitive element at a precise location within the internal cavity of the metallic tube and facilitating the automated manufacture of the temperature sensor. In FIG. 4, an aluminum oxide substrate 100 is shown. The substrate is scribed and separated into a plurality of individual strips 102. In one embodiment of the present invention, an aluminum oxide substrate of three inches by three inches is scribed to a depth of 52 percent of its thickness, which is 0.040 inches, and then separated into twenty individual substrates. Each of the individual substrates 102 is approximately 0.150 inches wide, 3 inches long and 0.040 inches thick. In one particular embodiment of the present invention, two holes are formed through the thickness of each of the twenty substrates 102 as shown in FIG. 4. The holes, 110 and 112, are approximately 0.030 inches in diameter in one embodiment and extend through the thickness of the substrates. The holes are spaced approximately 0.150 inches from one end of each of the individual strips. The holes are centered in relation to the width of each strip and spaced apart from each other by approximately 0.085 inches. However, it is important to note that the holes are not always required and, in a most preferred embodiment, are not used. After the strips are separated from the substrate 100 shown in FIG. 4, each strip 102 is inserted into an associated tube 10 as described below.

Although the present invention will be described below, and illustrated in FIGS. 5A-5G, as individual strips 102, it should be understood that all of the precesses illustrated in FIGS. 5A-5G and FIG. 6 are performed prior to separation of the strips 102 from the substrate 100. In a typical application of the present invention, the strips 102 are separated from the substrate 100 after all operations are complete except for the insertion of the strip 102 into the tube 10. The individual operations represented in FIGS. 5A-5G are illustrated in association with a single strip 102 for the purpose of clarity of the illustration, but it should be understood that all of these operations are more typically performed while the strips 102 remain attached to each other in the substrate 100.

In FIG. 5A, the substrate 102 is shown after being separated from the larger substrate 100 shown in FIG. 4. The two holes, 110 and 112, are shown extending through the thickness of the substrate at one end. However, it should be clearly understood that alternative embodiments of the present invention can be made without any holes through the substrate. This possibility will be described in greater detail below. For purposes of this description, the two ends regions of the substrate 102 will be identified as the first end region to the right and the second end region to the left. The first end region is the portion of the substrate 102 through which the two holes are formed. The second end region, to the left in FIGS. 5A-5G, is the end region of the substrate that will eventually be subjected to extremely high temperatures.

FIG. 5B shows a first gold pad 120 and a second gold pad 122. These gold pads are disposed on the surface of the substrate 102 through the use of known processes. One way to dispose the gold pads on the substrate is to apply a gold solution, through an appropriate screening process, and then subject the gold solution to an elevated temperature. Regardless of the specific method used to dispose the gold pads, 120 and 122, on the substrate, the gold pads serve as electrical contacts in the manner that will be described in greater detail below.

After the gold pads, 120 and 122, are deposited on the surface of the substrate 102, first and second conductive strips are deposited on the substrate as shown in FIG. 5C. The first conductive strip 130 and the second conductive strip 132 extend from the first end region of the substrate 102 to the second end region. In a preferred embodiment of the present invention, the conductive strips are made of a palladium silver alloy. At the first end region of the substrate, the conductive strips are provided with an enlarged pad surface to facilitate the connection of the conductive strips to conductive wires in the manner that will be described in greater detail below. The conductive strips, 130 and 132, are deposited in overlapping relation with the gold pads, 120 and 122, in order to assure good electrical communication between the gold pads and the conductive strips.

Another significant advantage of the use of the conductive strips, 130 and 132, is that they permit an important adjustment of the resistance of the strips to match the operating characteristics of the RTD 16. For example, if a longer substrate 102 is required, the widths of the conductive strips can be increased to reduce their resistance. Therefore, longer and wider conductive strips can be used to match the resistance of shorter and narrower strips in another style of substrate 102. Since the operation of the RTD 16 is somewhat dependent on the resistance of the electrical connection between it and external equipment, this ability to match the resistance of the conductive strips to requirements of the RTD 16 allows a single RTD design to be used with temperature sensors of many different lengths. This flexibility reduces the need to have many RTD designs for these same purposes.

In FIG. 5D, an insulative layer 140 is shown deposited over the first and second conductive strips. The insulative layer 140 comprises a crystallizing glass and, after it is deposited on the substrate 102, it is subjected to an elevated temperature. Although FIG. 5D shows the insulative layer as two separate insulative strips over the two conductive strips, it should be understood that the insulative layer 140 could be a single deposition having a width that is sufficient to cover both conductive strips. In addition, a preferred embodiment of the present invention deposits the insulative layer 140 in two individual steps. A first step includes the process of depositing a layer of crystallizing glass directly over each of the two conductive strips and then curing the glass. This step is followed by a second step of depositing an additional layer of the crystallizing glass over the first layer of crystallizing glass and then curing the second layer. This process reduces the porosity of the insulating layer and improves the performance of the temperature sensor. The length of the insulating layer 140, which can be crystallizing glass, is selected to cover the entire length of the two conductive strips and leave only the gold pads, 120 and 122, and the PdAg solder points, 112 and 110, extending from under the insulative layer at the second and first end regions of the substrate 102, respectively. In FIG. 5D, a small circle 150 represents a globule of ceramic paste that is deposited near the first and second gold pads, 120 and 122. This globule of glass paste serves to facilitate the attachment of the RTD 16 as shown in FIG. 5E. The RTD, in a preferred embodiment of the present invention, is attached to the substrate 102 by the globule of glass paste 150 with the serpentine resistive element facing away from the substrate 102. This is slightly different from the process described above in conjunction with FIG. 2. After the RTD 16 is attached to the substrate 102, the gold pads are connected in electrical communication with the pads, at the ends of the serpentine pattern, by wire bonds. In a particularly preferred embodiment of the present invention, each gold pad is attached to its associated conductive pad of the RTD by two individual wire bonds. However, a single wire bond at each location is much more typical. This duplication of the electrical connection between the gold pads and the RTD increases the reliability of the device in the event that one of the two redundant wire bonds is broken during manufacture, assembly or use. The use of a pair of wire bonds at each of these two electrical connections is not a requirement in all embodiments of the present invention, but is used in certain embodiments for the purpose of redundancy and improved reliability. These wire bonds are illustrated in FIG. 5F, but their small size makes it difficult to clearly illustrate this concept. Therefore, it should be understood that between the gold pads, 120 and 122, and the conductive pads of the RTD there exists at least one wire bond between each gold pad and its associated conductive pad on the RTD structure. In certain instances, double wire bonds are used to improve the reliability of the connection.

In known types of temperature sensors, the conductive wires, 20 and 22, are typically connected to the RTD pads by the use of platinum ribbons, as described above in conjunction with FIG. 2. The present invention eliminates this process and replaces it with the connections between the RTD and the gold pads which uses wire bonds. This reduces both the material and assembly costs. Although the dimensions of the present invention can be selected to suit any particular purpose, one preferred embodiment utilizes palladium silver conductive strips which are approximately 0.005 to 0.006 inches thick and are made from a material that is commercially available from DuPont by the identification 6277. The gold pads are approximately 0.003 to 0.004 inches thick. The ceramic paste 170, described below in conjunction with FIG. 5G, comprises alumina oxide particles in a matrix which is curable to form a solid protection globule.

FIG. 5G shows the substrate 102 after a globule of refractory cement 170 has been deposited over the RTD 16 and the gold pads, 120 and 122. The refractory cement 170 is shown on the surface of the substrate 102 covering the RTD 16, the gold pads, 120 and 122, the first and second conductive strips, 130 and 132, and the insulative layer 140 at the second end region of the substrate. The purpose of this refractory cement is to protect the RTD, gold pads and wire bonds from physical damage or contamination.

FIG. 6 is an enlarged view of the second end region of the substrate 102. For purposes of clarity, the relative sizes of the elements shown in FIG. 6 have not been precisely maintained. The RTD 16 is shown with its serpentine resistor 180 and its conductive pads, 190 and 192. It should be understood that the serpentine resistor 180 has been significantly simplified from its typical pattern that is shown more clearly in FIG. 3 and described in U.S. Pat. No. 4,375,056. In addition, it should be understood that FIG. 6 does not show the insulative layer 140 that would typically extend over the entire lengths of the conductive strips, 130 and 132, and over a portion of the gold pads, 120 and 122. The purpose of FIG. 6 is to illustrate the wire bond connection between the first and second gold pads and the two contact pads, 190 and 192, of the RTD 16. As can be seen, each of the gold pads is connected to its associated conductive pad with a pair of wire bonds. In other words, the first gold pad 120 is connected to the conductive pad 190 by two wire bonds, 160 and 160'. In addition, the second gold pad 122 is connected to the conductive pad 192 by two wire bonds, 162 and 162'. As described above, this redundancy is provided for the purpose of improving the reliability of the device by providing an additional wire bond in the event that one of the two wire bond bonds at either location is broken during assembly or use.

FIG. 7 shows the first end region of the substrate 102. In certain embodiments of the present invention when the holes, 110 and 112, are not provided through the thickness of the substrate 102, a conductive wire 200 can be connected directly to the pads at the first end region of the two conductive strips. In other words, the side view in FIG. 7 shows the first end region of the substrate 102 where the two holes, 110 and 112, are shown in FIGS. 5A–5G. In order to connect the RTD 16 in electrical communication with an external device, such as the control circuit of an oven, some means must be provided to connect the ends of the conductive strips, 130 and 132, to conductive wires near the first end region of the substrate 102. This can be accomplished by passing the conductive wires through the holes in the substrate 102 or, alternatively, by merely soldering the conductive wire 200 to the enlarged portions of the conductive strips at the first end region of the substrate 102. FIG. 7 shows this second alternative which does not require the use of the holes, 110 and 112, through the substrate 102. The wire 200 is insulated with a Teflon coating 202. One skilled in the art will recognize that the use of Teflon coated wire for these purposes is significantly less expensive than using fiber glass sleeved conductors as described above in conjunction with the prior art.

Also shown in FIG. 7 is a sleeve 210 that can be made of Teflon or other suitable materials. The sleeve 210 is generally cylindrical and can have a slot 212 formed through it at one end. Typically, no slot 212 is needed if the sleeve 210 is Teflon. It should be understood that the section view of the sleeve 210 in FIG. 7 shows one slot 212 through the wall of the sleeve. However, two slots would be formed diametrically opposite from each other to receive the substrate 102 within the slot 212. The sleeve 210 can be placed over the first end region of the substrate 102 by moving the substrate 102 in the direction represented by arrow 214 in FIG. 7. The conductive wires 200 that are attached to the first end region of both the first and second conductive strips by the solder 220 would therefore be extended through the cylindrical opening of the sleeve 210 and the first end portion of the substrate 102 would be moved into the slot 212 until it reaches the end of the slot. In an alternate embodiment of the present invention, the slot 212 is not formed entirely through the thickness of the sleeve 210. Instead, it is formed partially through the thickness and provides a guide shaped into the inner cylindrical surface of the sleeve 210 which is formed to accept the substrate 102 therein. Either of these two alternative configurations will achieve the goals of the present invention with respect to the sleeve 210.

With regard to the connections between the conductive wires and the conductive strips, 130 and 132, near the first end region of the substrate 103, certain very high temperature applications may benefit from the use of platinum ribbons between the end pads of the conductive strips and the conductive wires. Although the very small size of the components in the region of this connection is difficult to illustrate, it should be understood that the ends of the conductive wires can be passed through the holes, 110 and 112, to extend through the substrate 102 and the end pads of the conductive strips. The platinum ribbons would be welded to the wires and to the conductive strips in these high temperature applications. At the opposite side of the substrate 102, the conductive wires would be bent to extend in a direction away from the substrate in a direction that is generally parallel to the planar surfaces of the substrate. In addition, it should be understood that the connection between the conductive wires and the conductive strips, in certain embodiments of the present invention, could be protected by a ceramic globule of alumina oxide paste in a manner that is generally similar to the method by which the opposite ends of the conductive strips are protected. It should be clearly understood that it is not always necessary to extend the wires through the holes, 110 and 112. Instead, the wires can be placed directly on the top surface and soldered with high temperature solder.

Figure 8A:
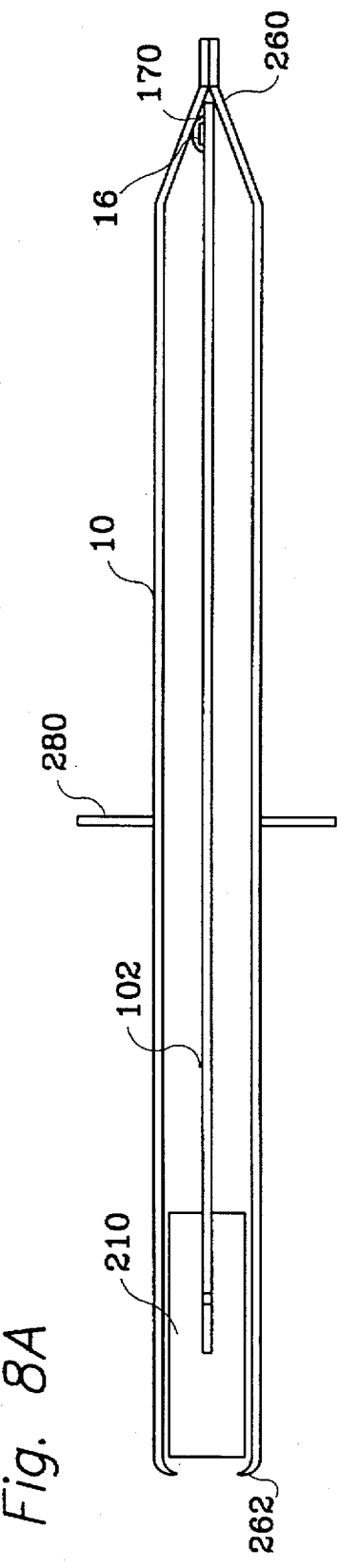
FIGS. 8A and 8B show two modifications of the present invention.
Figure 8B:
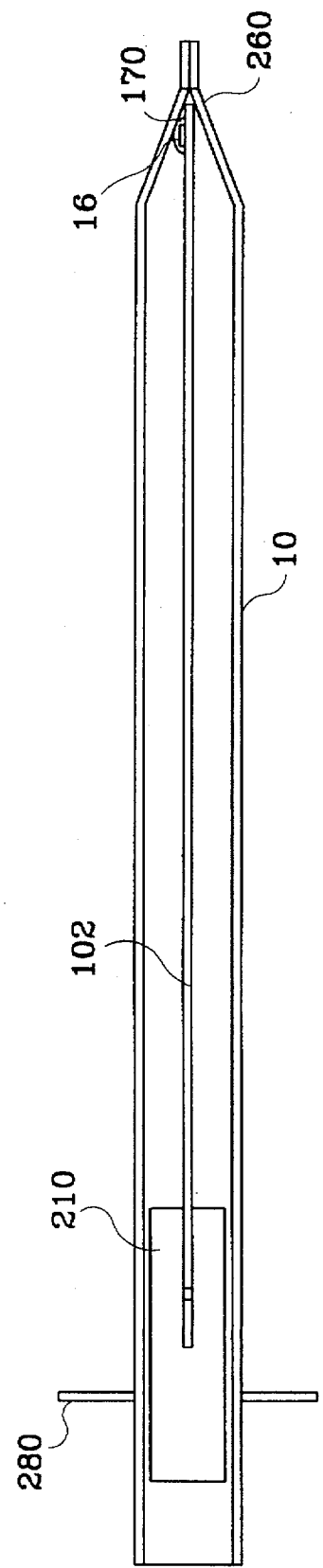

FIGS. 8A and 8B show two alternative configurations that can be used in conjunction with the present invention. In FIG. 8A, the substrate 102 is disposed within a metallic tube 10. The substrate 102 extends along most of the length of the tube 10, thus accurately disposing the RTD 16 at the second end region of the tube 10, where it is crimped to form the shape represented by reference numeral 260. At the opposite end of the tube 10, the sleeve 210 is disposed around the first end region of the substrate 102. The sleeve 210, in turn, is disposed within the end of the tube 10 and the tube is crimped as indicated by reference numeral 262 to confine the sleeve 210 within the internal opening of the tube 10. As illustrated in FIG. 8A, the substrate 102 is confined within the tube 10 and held at a position that is generally in the central region of the internal cavity of the tube 10. It is also confined between the crimped end 260 at the second end region of the substrate and the crimped end 262 at the first end of the substrate. A flange 280 is attached to the outer surface of the tube 10. This attachment can be accomplished either by spot welding the flange 280 to the tube 10 or, alternatively, by shaping an opening in the flange 280 that is in a force fit relationship with the outer dimension of the tube 10. Then, the flange 280 can be forced over a preselected portion of the length of the tube 10 until it reaches a desired position. The interference fit resulting from this procedure will hold the flange 280 in its proper place with respect to the tube 10.

FIG. 8B shows an alternate configuration of the device shown in FIG. 8A. FIG. 8B differs from FIG. 8A only in that the position of the flange 280 is much closer to the first end region of the substrate 102 than the flange 280 in FIG. 8A. Depending on the particular application of the temperature sensor, either of the two embodiments shown in FIGS. 8A and 8B can be used. The embodiment of FIG. 8A would typically be used in an application where the flange 280 is intended to be mounted to an inside wall surface of an oven. The length of the tube 10 to the left of the flange 280 in FIG. 8A allows sufficient clearance to extend the first end region of the substrate 102 through the oven wall and insulation portion to a position external to the oven cavity. Alternatively, the embodiment of FIG. 8B would be used in an application with the flange 280 is intended to be attached to an outer surface of an outer wall in an oven application. This provides a much longer portion between the flange 280 and the second end region of the substrate 102.

Figure 9:
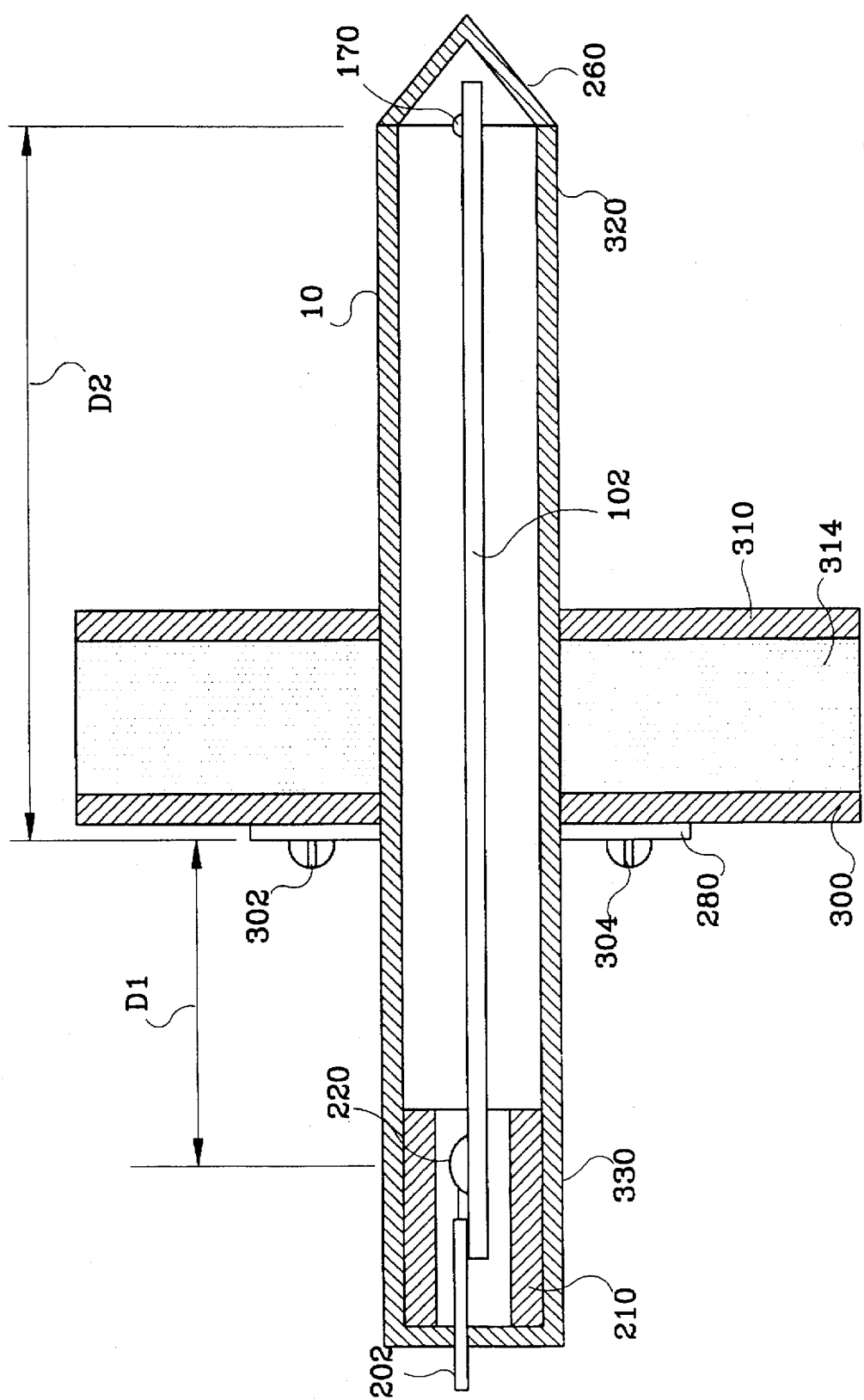
FIG. 9 shows a temperature sensor made in accordance with the present invention associated with an oven wall.

FIG. 9 shows the present invention mounted in relation to an oven wall. The flange 280 is attached to an outer oven wall 300 with two screws, 302 and 304. Between the outer oven wall 300 and an inner oven wall 310, a thickness of insulation 314 is provided. Therefore, a second end region 320 of the temperature sensor extends into the oven cavity and is exposed to extreme temperatures that can reach 1000 degrees Fahrenheit. The first end region 330 of the temperature sensor extends through the oven walls and is not exposed directly to the extreme temperatures of the oven cavity. The location of the flange 280 with respect to the first and second end regions of the substrate 102 can be selected to advantageously provide a sufficient thermal barrier between the oven cavity and the region where the conductive wires are attached to the conductive strips by the solder 220. The distance between the flange 280 and the first end region of the substrate 102 is identified as a first distance D1. The distance between the flange 280 and the second end region of the substrate 102 is identified as a second distance D2. The first distance D1 is selected to provide the sufficient thermal standoff between the internal cavity of the oven and the first end region of the substrate to allow low temperature processes to be used.

The magnitude of the first distance D1 is determined to place the first end region of the substrate, proximate the connections to the conductive wires, at a region where the temperature is sufficiently low to permit the use of less expensive components and processes. For example, if the RTD is disposed in an oven at approximately 1000 degrees Fahrenheit and the first end region of the substrate 102 is to be kept at a temperature less than 400 degrees Fahrenheit, the magnitude of the first distance D1 would be selected to accomplish this result. If the temperature sensor's characteristic provide a temperature drop of approximately 300 degrees Fahrenheit per inch, the first distance D1 would be chosen to be approximately two inches. In one particularly preferred embodiment of the present invention, a first distance D1 is approximately 1.375 inches. This first distance D1 would perform the intended function if the temperature drop along the first distance of the sensor is approximately 436.36 degrees Fahrenheit per inch. Of course, it should be clearly understood that the required temperatures at the first end region, the maximum expected oven temperature and physical limitations will vary from one application to another.

Some of the advantages of the present invention can be realized by a review of FIG. 9. For example, the rigid substrate 102 supports the RTD at a precisely determined position within the tube 10. In addition, the support provided by the rigid substrate 102 does not permit the conductive strips to come into contact with the internal surfaces of the metallic tube 10. This avoids the need for using electrical wires for this purpose. The electrical wires are flexible and would therefore require significantly greater insulation to be provided in the form of a fiberglass sleeve around the wires as they extend from the RTD at the second end region of the tube 10 to the first end region of the tube. The dielectric strength required by the electrical connection along the length of the internal portion of the tube is provided by the insulative layer 140 deposited over the conductive strips and, in addition, the dielectric strength is further provided by the spacing between the conductive strips and the nearest electrically conductive material within the inside surface of the tube 10. The sleeve 210 is shaped to maintain the position of the first end region of the substrate 102 proximate the central part of the tube 10 and at a location which places the RTD at a precise point at the opposite end of the tube 10.

Another significant advantage of the present invention is that it permits automated manufacturing techniques to be employed. With reference to FIGS. 5A–5G, it can be seen that all of the manufacturing steps represented by the stages illustrated in FIGS. 5A–5G can be performed automatically by machinery and do not require manual intervention. Compared to the device shown in FIGS. 1 and 2, which require significant manual operations, the present invention reduces the manual involvement and thereby reduces the cost of the temperature sensor. Equally important is the enhanced reliability and repeatability that is available when the temperature sensor is manufactured by machines that are highly automated. In a temperature sensor made in accordance with the present invention, the wires, 20 and 22, are not used and therefore do not need to be attached manually to the RTD. The RTD and its protective sleeve 12 do not have to be assembled together and sealed with a ceramic past within the cylinder 12. After assembly of the RTD 16 to the individual wires, 20 and 22, as shown in FIG. 1, a temperature sensor made in accordance with the prior art has to be manually assembled by attempting to place the RTD at a predetermined location at the blind end of the tube 10 near the crimped portion 36. Since the conductive wires, 20 and 22, are flexible, this assembly is both difficult and unpredictable. Since a rigid substrate 102 is used by the present invention, this assembly is fixed in length and the RTD can be placed accurately at the second end region of the tube because of the known length of the rigid substrate. In addition, the fiberglass insulative sleeve used to protect the wires, 20 and 22, and provide the required dielectric strength is not needed in the present invention because of the insulative layer 140 disposed over the conductive strips and also because of the spacing from the tube provided by the rigidity of the substrate 102. Additionally, even with the fiberglass sleeve, a prior art sensor's dielectric strength will degrade in the presence of humidity.

As described above in conjunction with FIGS. 5B–5G, gold pads are used in the preferred embodiment of the present invention to permit wire bond connections to be made to the RTD in the portion of the sensor that is expected to reach the highest temperatures. The use of gold pads within a high temperature region of an oven is not known to those skilled in the art and this innovation permits very good electrical contact to the RTD.

Although the present invention has been described with particular detail and illustrated with significant specificity, it should be understood that alternative embodiments are also within its scope. Slight changes can be made to the various materials and structural shapes described above without removing the sensor from the scope of the present invention.

The embodiments of the invention in which an exclusive property or right is claimed are defined as follows:

1. A temperature sensor, comprising:
    a generally rigid substrate having a first end region and a second end region;
    a first conductive strip deposited on said substrate and extending from said first end region to said second end region;
    a second conductive strip deposited on said substrate and extending from said first end region to said second end region;
    an insulative layer deposited over and between said first and second conductive strips, said first and second strips being disposed between said substrate and said insulative layer;
    a temperature sensitive element disposed on said second end region of said substrate, said temperature sensitive element being connected electrically between said first and second conductive strips; and
    a tube, said substrate being disposed within said tube.
2. The sensor of claim 1, wherein:
    said substrate is made of aluminum oxide.
3. The sensor of claim 1, wherein:
    said first and second conductive strips are made of a palladium silver alloy.
4. The sensor of claim 1, wherein:
    said temperature sensitive element comprises a resistive temperature detector and said insulative layer comprises crystallizing glass.
5. The sensor of claim 1, further comprising:
    a protective coating disposed over said temperature sensitive element, said temperature sensitive element being disposed between said substrate and said protective coating.
6. The sensor of claim 5, wherein:
    said protective coating is a refractory cement.
7. The sensor of claim 1, wherein:
    said temperature sensitive element is connected to said first and second conductive strips with wire bonds.
8. The sensor of claim 1, further comprising:
    a first gold pad and a second gold pad, said first and second gold pads being deposited on said substrate at said second end region, said first and second gold pads being connected electrically to said first and second conductive strips, respectively, said temperature sensitive element being connected electrically between said first and second gold pads.
9. The sensor of claim 8, wherein:
    said first gold pad is connected to said temperature sensitive element with a first pair of wirebonds and said second gold pad is connected to said temperature sensitive element with a second pair of wirebonds.
10. The sensor of claim 1, further comprising:
    a mounting flange attached to said tube at a preselected position of said tube, said preselected position being a first distance from said first end region, said preselected position being a second distance from said second end region, said mounting flange being attached to a wall of an oven to dispose said first end region at a first location outside of said oven and to dispose said second end region in thermal communication with a second location within said oven having an elevated temperature, said first distance being sufficiently distant from said second location to maintain said first end region at a preselected temperature differential below said elevated temperature, said preselected temperature differential being at least four hundred degrees Fahrenheit.
11. The sensor of claim 10, wherein:
    said first distance is at least one inch.
12. The sensor of claim 10, wherein:
    said first distance is at least two inches.

13. The sensor of claim 1, wherein:

said first and second conductive strips are connected electrically to first and second conductive wires proximate said first end region.

14. The sensor of claim 13, further comprising:

an insulative cover disposed over said first and second conductive strips at said first end region proximate the connection between said first and second conductive strips and said first and second conductive wires.

15. The sensor of claim 13, wherein:

said first and second conductive strips are connected electrically to said first and second conductive wires with solder.

16. The sensor of claim 1, wherein:

said tube is crimped proximate said second end region of said substrate to seal said tube.

17. A temperature sensor, comprising:

a generally rigid substrate having a first end region and a second end region;

a first conductive strip deposited on said substrate and extending from said first end region to said second end region;

a second conductive strip deposited on said substrate and extending from said first end region to said second end region;

an insulative layer deposited over and between said first and second conductive strips, said first and second strips being disposed between said substrate and said insulative layer;

a temperature sensitive element disposed on said second end region of said substrate, said temperature sensitive element being connected electrically between said first and second conductive strips;

a tube, said substrate being disposed within said tube; and a first gold pad and a second gold pad, said first and second gold pads being deposited on said substrate at said second end region, said first and second gold pads being connected electrically to said first and second conductive strips, respectively, said temperature sensitive element being connected electrically between said first and second gold pads, said first and second conductive strips being shaped to achieve a preselected resistance thereof.

18. The sensor of claim 17, wherein:

said first gold pad is connected to said temperature sensitive element with a first pair of wirebonds and said second gold pad is connected to said temperature sensitive element with a second pair of wirebonds.

19. The sensor of claim 17, wherein:

said substrate is made of aluminum oxide; and said first and second conductive strips are made of a palladium silver alloy.

20. The sensor of claim 17, further comprising:

a protective coating disposed over said temperature sensitive element, said temperature sensitive element being disposed between said substrate and said protective coating, said temperature sensitive element comprising a resistive temperature detector, said protective coating being a refractory cement.

21. The sensor of claim 17, wherein:

said temperature sensitive element is connected to said first and second conductive strips with wire bonds.

22. The sensor of claim 17, further comprising:

a mounting flange attached to said tube at a preselected position of said tube, said preselected position being a first distance from said first end region, said preselected position being a second distance from said second end region, said mounting flange being attached to a wall of an oven to dispose said first end region at a first location outside of said oven and to dispose said second end region in thermal communication with a second location within said oven having an elevated temperature, said first distance being sufficiently distant from said second location to maintain said first end region at a preselected temperature differential below said elevated temperature, said preselected temperature differential being at least four hundred degrees Fahrenheit, said first distance being at least one inch.

23. The sensor of claim 22, wherein:

said first distance is at least two inches.

24. The sensor of claim 17, further comprising:

first and second conductive wires proximate said first end region, said first and second conductive strips being connected electrically to said first and second conductive wires proximate said first end region; and an insulative cover disposed over said first and second conductive strips at said first end region proximate the connection between said first and second conductive strips and said first and second conductive wires.

25. The sensor of claim 24, wherein:

said first and second conductive strips are connected electrically to said first and second conductive wires with high temperature solder.

26. The sensor of claim 17, wherein:

said tube is crimped proximate said second end region of said substrate to seal said tube.

27. A temperature sensor, comprising:

a generally rigid substrate having a first end region and a second end region;

a first conductive strip deposited on said substrate and extending from said first end region to said second end region;

a second conductive strip deposited on said substrate and extending from said first end region to said second end region;

an insulative layer deposited over and between said first and second conductive strips, said first and second strips being disposed between said substrate and said insulative layer;

a temperature sensitive element disposed on said second end region of said substrate, said temperature sensitive element being connected electrically between said first and second conductive strips;

a tube, said substrate being disposed within said tube; and a first gold pad and a second gold pad, said first and second gold pads being deposited on said substrate at said second end region, said first and second gold pads being connected electrically to said first and second conductive strips, respectively, said temperature sensitive element being connected electrically between said first and second gold pads, said first gold pad being connected to said temperature sensitive element with a first wirebond and said second gold pad is connected to said temperature sensitive element with a second wirebond.

28. The sensor of claim 27, further comprising:

a protective coating disposed over said temperature sensitive element, said temperature sensitive element being disposed between said substrate and said protective coating, said temperature sensitive element comprising a resistive temperature detector, said protective coating being a refractory cement, said substrate being made of aluminum oxide, said first and second conductive strips being made of a palladium silver alloy, said temperature sensitive element being connected to said first and second conductive strips with wire bonds.

29. The sensor of claim 27, further comprising:

a mounting flange attached to said tube at a preselected position of said tube, said preselected position being a first distance from said first end region, said preselected position being a second distance from said second end region, said mounting flange being attached to a wall of an oven to dispose said first end region at a first location outside of said oven and to dispose said second end region in thermal communication with a second location within said oven having an elevated temperature, said first distance being sufficiently distant from said second location to maintain said first end region at a preselected temperature differential below said elevated temperature, said preselected temperature differential being at least four hundred degrees Fahrenheit, said first distance being at least one inch.

30. The sensor of claim 29, wherein:

said first distance is at least two inches.

31. The sensor of claim 27, further comprising:

first and second conductive wires proximate said first end region, said first and second conductive strips being connected electrically to said first and second conductive wires proximate said first end region; and an insulative cover disposed over said first and second conductive strips at said first end region proximate the connection between said first and second conductive strips and said first and second conductive wires.

32. The sensor of claim 31, wherein:

said first and second conductive strips are connected electrically to said first and second conductive wires with platinum ribbons.

33. The sensor of claim 27, wherein:

said tube is crimped proximate said second end region of said substrate to seal said tube.

* * * * *